US011191384B2

(12) United States Patent
Delrue et al.

(10) Patent No.: US 11,191,384 B2
(45) Date of Patent: Dec. 7, 2021

(54) COOKING METHOD FOR A COOKING APPLIANCE WITH A MOTION-INDUCING MEANS AND CORRESPONDING COOKING APPLIANCE

(71) Applicant: SEB S.A., Ecully (FR)

(72) Inventors: Olivier Delrue, Selongey (FR); François Letain, Marcilly-sur-Tille (FR)

(73) Assignee: SEB S.A.

( * ) Notice: Subject to any disclaimer, the term of this patent is extended or adjusted under 35 U.S.C. 154(b) by 324 days.

(21) Appl. No.: 14/785,478

(22) PCT Filed: Apr. 11, 2014

(86) PCT No.: PCT/FR2014/050895
§ 371 (c)(1),
(2) Date: Oct. 19, 2015

(87) PCT Pub. No.: WO2014/170589
PCT Pub. Date: Oct. 23, 2014

(65) Prior Publication Data
US 2016/0081509 A1    Mar. 24, 2016

(30) Foreign Application Priority Data

Apr. 19, 2013   (FR) ...................................... 1353587

(51) Int. Cl.
| A47J 27/00 | (2006.01) |
| A47J 37/04 | (2006.01) |
| A47J 37/06 | (2006.01) |
| A23L 5/10  | (2016.01) |
| A47J 37/12 | (2006.01) |
| A47J 36/16 | (2006.01) |
| A47J 36/32 | (2006.01) |

(52) U.S. Cl.
CPC ............... *A47J 27/002* (2013.01); *A23L 5/15* (2016.08); *A23L 5/17* (2016.08); *A47J 27/004* (2013.01);
(Continued)

(58) Field of Classification Search
CPC ......... A23L 5/15; A23L 5/17; A23V 2002/00; A47J 27/002; A47J 37/047; A47J 37/0641;
(Continued)

(56) References Cited

U.S. PATENT DOCUMENTS 4,963,708 A * 10/1990 Kearns .................. A47J 36/027
219/731
7,993,694 B2    8/2011 Goderiaux et al.
(Continued)

FOREIGN PATENT DOCUMENTS

FR        2871043 A1    12/2005
JP      2002000471 A     1/2002
(Continued)

*Primary Examiner* — Drew E Becker
*Assistant Examiner* — Austin Parker Taylor
(74) *Attorney, Agent, or Firm* — Lerner, David, Littenberg, Krumholz & Mentlik, LLP

(57) ABSTRACT

Provided is a method of cooking for a food-cooking appliance having a reception means designed to receive the food products, a motion-inducing means positioned inside the reception means, and at least one main heating means. The method includes: a first cooking step during which the relative rotation of the reception means and of the motion-inducing means is neutralized and at least one main heating means is operated in order to regulate the temperature to a first set-point value; and a second cooking step during which the relative rotation of the reception means and of the motion-inducing means is active and at least one main heating means is operated in order to regulate the temperature to a second set-point value higher than the first.

11 Claims, 3 Drawing Sheets

(52) U.S. Cl.
 CPC ............ *A47J 36/165* (2013.01); *A47J 36/32* (2013.01); *A47J 37/047* (2013.01); *A47J 37/0641* (2013.01); *A47J 37/1257* (2013.01); *A47J 37/1266* (2013.01); *A47J 37/1271* (2013.01); *A23V 2002/00* (2013.01)

(58) Field of Classification Search
 CPC ................ A47J 37/1266; A47J 37/1257; A47J 37/1271; A47J 36/165; A47J 36/32; A47J 27/004
 See application file for complete search history.

(56) References Cited

U.S. PATENT DOCUMENTS

| | | | |
|---|---|---|---|
| 2005/0011370 A1* | 1/2005 | Xu | A47J 36/165 99/409 |
| 2005/0223906 A1 | 10/2005 | Xu et al. | |
| 2008/0213447 A1* | 9/2008 | Payen | A47J 37/043 426/438 |
| 2008/0257168 A1* | 10/2008 | Wolfe | A47J 36/165 99/348 |
| 2010/0028514 A1 | 2/2010 | Goderiaux et al. | |
| 2010/0183780 A1* | 7/2010 | Breunig | F24C 7/08 426/233 |

FOREIGN PATENT DOCUMENTS

| | | | | |
|---|---|---|---|---|
| JP | 2008178462 A | * | 8/2008 | ............ A47J 27/004 |
| JP | 2008178462 A | | 8/2008 | |
| JP | 2009525101 A | | 7/2009 | |
| WO | 2006000699 A2 | | 1/2006 | |
| WO | 2007088279 A1 | | 8/2007 | |

* cited by examiner

COOKING METHOD FOR A COOKING APPLIANCE WITH A MOTION-INDUCING MEANS AND CORRESPONDING COOKING APPLIANCE

CROSS-REFERENCE TO RELATED APPLICATIONS

This application is the United States national phase of International Application No. PCT/FR2014/050895 filed Apr. 11, 2014, and claims priority to French Patent Application No. 1353587 filed Apr. 19, 2013, the disclosures of which are hereby incorporated in their entirety by reference.

FIELD OF THE INVENTION

This invention pertains to the technical field of cooking methods for electric cooking appliances with a stirring means arranged inside a food reception means, as well as the corresponding cooking appliances.

This invention pertains in particular, but not exclusively, to a cooking method for electric appliances designed for mixing and cooking food in pieces, such as fries or pieces of chicken, comprising a stirring means positioned inside a chamber arranged inside a casing that encloses a hot air heating mechanism, in which the stirring means and the chamber are designed to be set into motion with respect to one another, so as to mix and stir the food and the fat inside the chamber. Patent WO 2006/000699 discloses such cooking appliances.

DESCRIPTION OF RELATED ART

Patent WO 2007/088279 discloses a cooking appliance of the kind mentioned above, comprising a stirring paddle spun inside a vessel. The geometry of the stirring paddle and the movement of the stirring paddle inside the vessel help to move the fries around with respect to one another. The different surfaces of the fries can thus successively come into contact with the bottom of the chamber, where they can be coated in fat, while the fries positioned at the top of the chamber are more exposed to the flow of hot air. Due to these arrangements, better cooking homogeneity is achieved. However, one disadvantage of the aforementioned construction lies in the height of the pile of fries pushed by the stirring paddle. This effect may lead to sizing the chamber based on the recipe requiring the most space, thereby making the appliance less compact. This effect may also lead to reducing the amount of food prepared for the recipe requiring the most space, thereby diminishing the capacity of the appliance. Moreover, the stirring paddle is mobile with respect to an obstacle arranged inside the chamber. This obstacle, which partially blocks the pile of fries being pushed by the stirring paddle, further increases the height of the pile of fries pushed by the stirring paddle.

One purpose of this invention is to improve the cooking quality of pieces of food coated in breadcrumbs.

SUMMARY OF THE INVENTION

This objective is achieved by a cooking method for a food cooking appliance comprising a reception means designed to receive the food, a stirring means positioned inside the reception means, at least one main heating means, the reception means and the stirring means being designed to move in relative rotation, the reception means having a top opening, the appliance comprising a means for controlling at least the relative rotation and at least one main heating means, characterized in that the cooking method includes:

A first cooking step, during which the relative rotation of the reception means and of the stirring means is neutralized, and at least one main heating means is controlled to regulate the temperature to a first set-point value;

A second cooking step, during which the relative rotation of the reception means and the stirring means is active, and at least one main heating means is controlled to regulate the temperature to a second set-point value that is greater than the first.

In another variation of implementation, the duration of the first cooking step is between 35%-45% of the total time for both cooking steps.

In another variation of implementation, the first set-point value is between 135° C. and 145° C.

In another variation of implementation, the second set-point value is between 165° C. and 180° C.

In another variation of implementation, the total cooking time for both cooking steps corresponds to the total cooking time selected by a user.

In another variation of implementation, the average speed of relative rotation of the reception means with respect to the stirring means is between 1 and 5 rpm.

In another variation of implementation, the relative rotation of the reception means with respect to the stirring means is continuous.

In another variation of implementation, the relative rotation of the reception means with respect to the stirring means is intermittent.

The invention also pertains to a food cooking appliance comprising a reception means designed to receive the food, a stirring means positioned inside the reception means, at least one main heating means, the reception means and the stirring means being designed to move in relative rotation, the reception means having a top opening, the appliance comprising a means of controlling at least the relative rotation and at least one main heating means, characterized in that the controlling means, equipped with an electronic control unit, comprises a cooking program that includes:

A first cooking step, during which the controlling means neutralizes the relative rotation of the reception means and the stirring means, and controls said at least one main heating means to regulate the temperature to a first set-point value;

A second cooking step, during which the controlling means activates the relative rotation of the reception means and the stirring means, and controls said at least one main heating means to regulate the temperature to a second set-point value that is greater than the first.

BRIEF DESCRIPTION OF THE DRAWINGS

The invention will be better understood upon review of one example of implementation, which should by no means be taken as limiting, depicted in the appended drawings, in which.

DETAILED DESCRIPTION OF THE INVENTION

Figure 1:
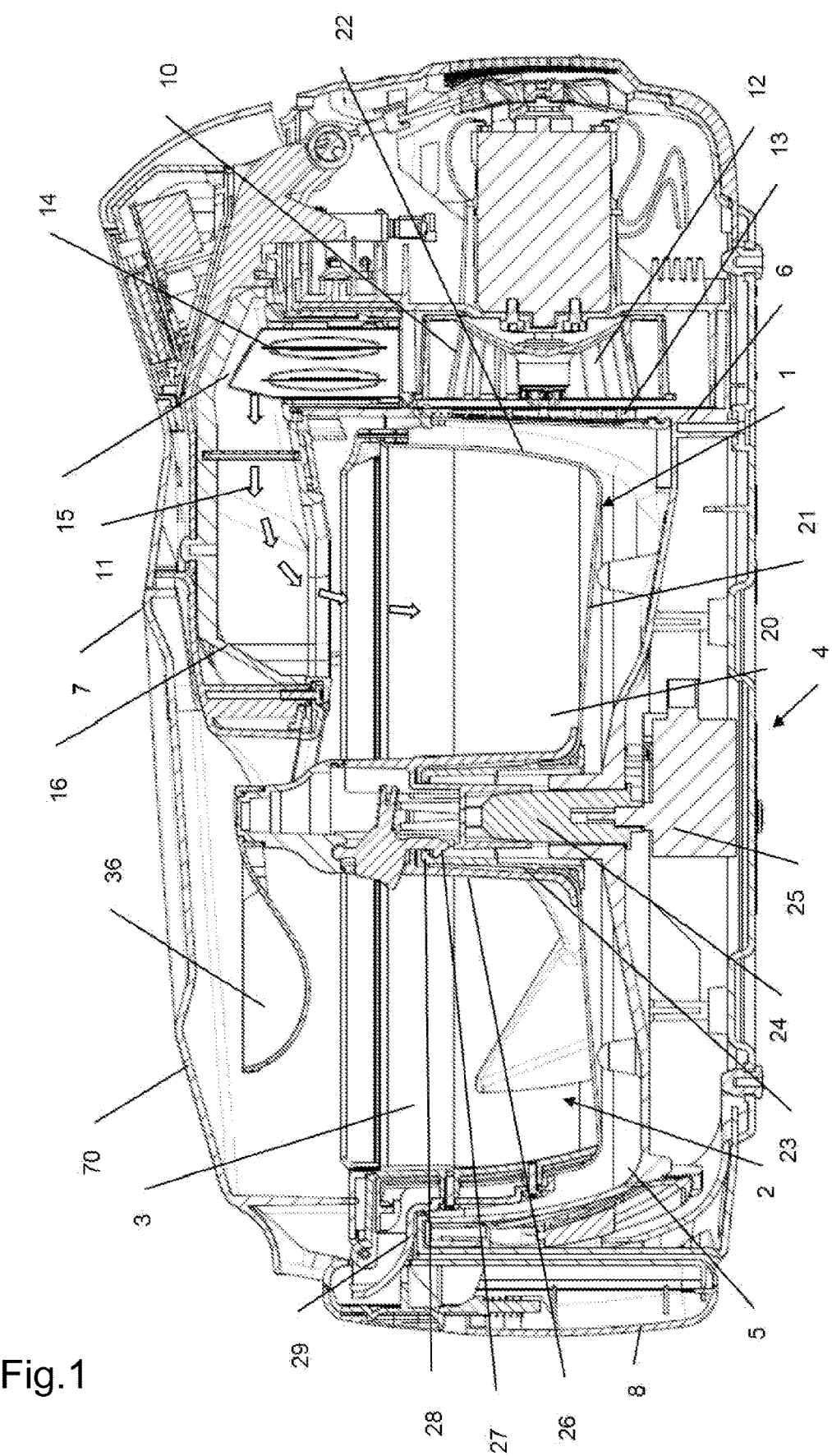
FIG. 1 is a longitudinal cross-section view of one example of implementation of an appliance for executing the method described in the invention.

The cooking appliance depicted in FIG. 1 comprises a reception means (1) designed to receive the food, and a stirring means (2) positioned inside the reception means (1). The reception means (1) has a top opening (3). The reception means (1) and the stirring means (2) are designed to move in relative rotation.

More specifically, the reception means (1) is arranged inside a casing (4). The casing (4) defines an enclosure (5) in which the reception means (1) is arranged. The casing (4) comprises a body (6) with a cover (7) on top. The cover (7) comprises a transparent or translucent part (70) arranged on top of the reception means (1).

The cooking appliance comprises a heating means (10). As depicted in FIG. 1, the heating means (10) generates a heating flow (11) that enters the reception means (1) through the top opening (3).

More specifically, the cooking appliance comprises a fan (12) designed to pump the air inside the enclosure (5) through an air intake (13) and to propel the air over a heating element (14) arranged in a conduit (15) that flows into the enclosure (5). One portion (16) of the conduit (15) is arranged in the cover (7).

More specifically, the reception means (1) is formed by a chamber (20) comprising a bottom (21) and a side wall (22). In the variation of implementation depicted in FIG. 1, the bottom (21) is slanted downward in the direction of the side wall (22). The chamber (20) has a central opening (23) designed to be a pathway for a drive shaft (24) spun by a motor (25). A ventilation shaft (26) is assembled on the central opening (23). The stirring means (2) is assembled on the drive shaft (24). The stirring means (2) has a hooking mechanism (27) designed to interlock with a restraint mechanism (28) positioned inside the ventilation shaft (26). The chamber (20) is advantageously made of a metal material, and preferably a coated metal material or stainless steel. The reception means (1) comprises a support (29) attached to the chamber (20). The reception means (1) comprises a handle (8). The handle (8) is, for example, assembled connected to the support (29).

Figure 2:
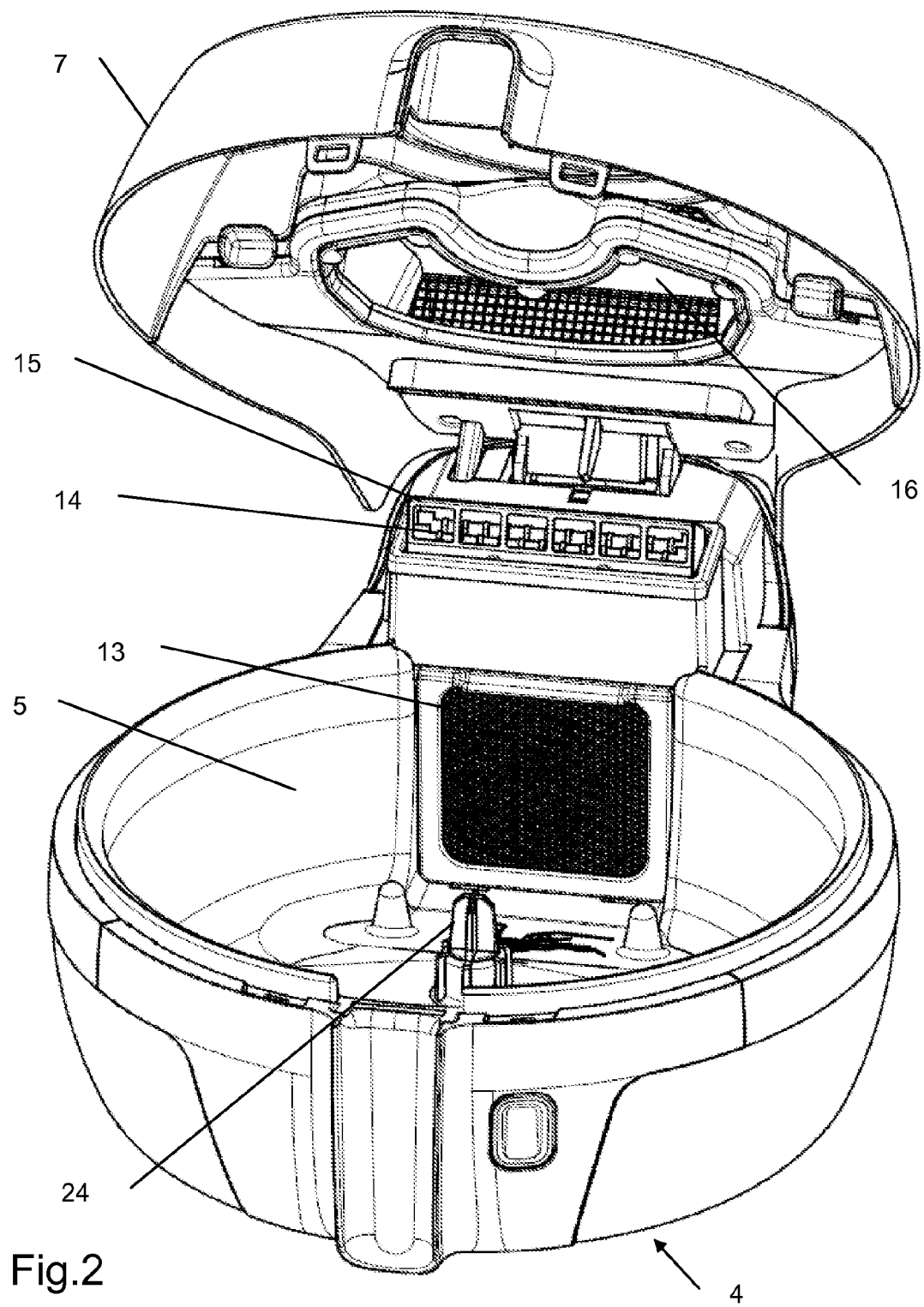
FIG. 2 is a perspective view, in the open position, of the appliance depicted in FIG. 1, in which the reception means has been removed.

The reception means (1) is assembled to be removable from the casing (4), FIG. 2 illustrating the casing (4) with the cover (7) open in the absence of the reception means (1).

Figure 3:
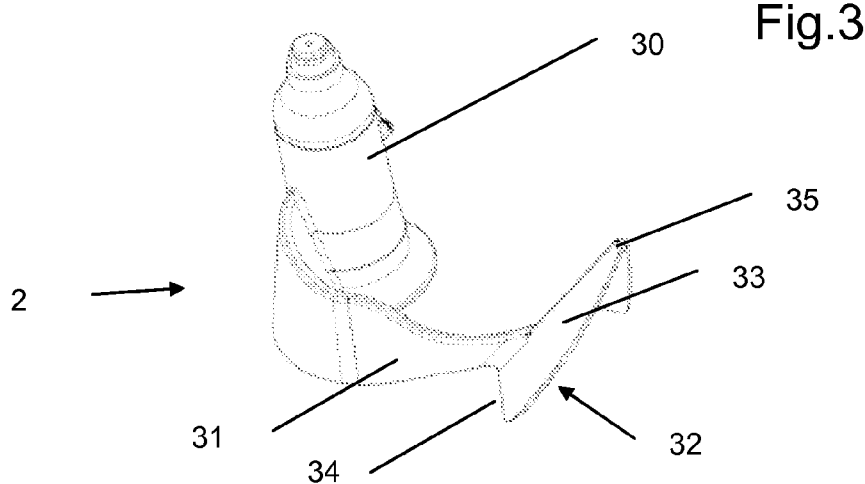
FIG. 3 is a perspective view of the stirring means designed to be arranged inside the reception means.

The stirring means (2) depicted in FIG. 3 comprises a hub (30) designed to cap the ventilation shaft (26), and an arm (31) stemming from the hub (30). The stirring means (2) comprises a means of lifting the food (32), formed by a slippery surface (33) that is slanted with respect to the axis of the hub (30). The width of the slippery surface (33) decreases from the lower front part (34) toward an upper back part (35). A scoop (36) is assembled to be removable on the upper end of the hub (30).

Figure 4:
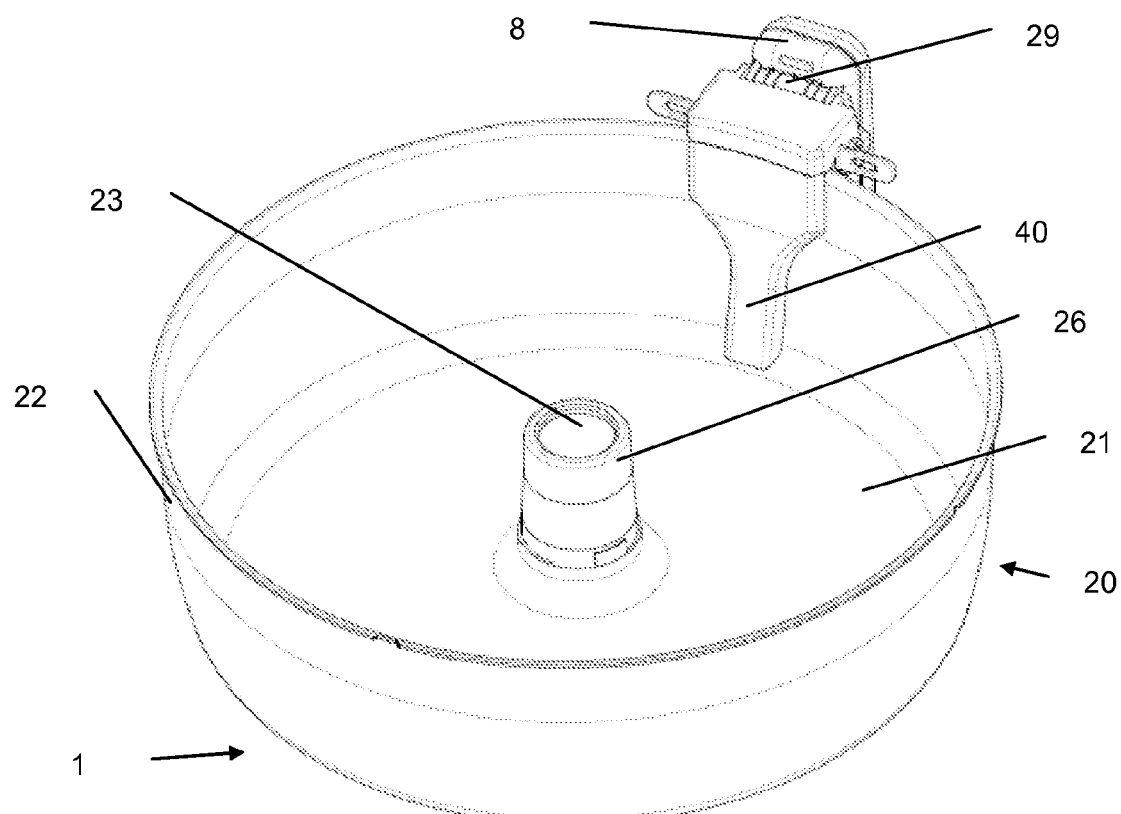
FIG. 4 is a perspective view of the reception means.

As seen in FIG. 4, a side obstacle (40) is positioned inside the reception means (1). More specifically, the side obstacle (40) stems from the support (29). The side obstacle (40) extends over at least one portion of the height of the side wall (22) of the chamber (20).

In the invention, the stirring means is spun by a motor that is mechanically connected to the drive shaft (24). The motor is controlled by an electronic control unit that activates or neutralizes the motor and therefore the rotation of the stirring means (2). The average rotation speed of the stirring means (2) is between 1 and 5 rpm.

Likewise, the electronic control unit supplies power to the heating means (10) of the appliance. In particular, the electronic control unit is designed to operate the appliance at two temperature levels, at least.

The appliance also comprises, in a self-evident manner, a user interface allowing the user, in particular, to turn on the appliance and to select, change or cancel a cooking mode that is pre-programmed in the electronic control unit.

In the invention, the electronic control unit makes it possible to carry out a specific cooking method that preserves the quality of foods coated in breadcrumbs. In particular, implementing this method browns the breading without detracting from its appearance.

To this end, the cooking method comprises two main steps. A first step of the method consists, for a determined period, of neutralizing the relative rotation of the reception means (1) and the stirring means (2) and of maintaining the interior temperature of the appliance at an initial temperature value.

In the first step, the non-spinning of the stirring means (2) preserves the breading covering the food, which, at the start of cooking, is fragile (risk of crumbling away). The temperature selected for this first step begins cooking the food and therefore solidifies the breading, yet without causing it to brown. Indeed, during this step the same surface of the food is exposed to the flow of hot air, while other surfaces are not directly exposed. At the end of this first step, the mechanical resistance of the breading has increased, and it can tolerate the stirring performed in the second step.

Indeed, the second step of the method consists simultaneously of activating the relative rotation of the reception means (1) and the stirring means (2) and maintaining the temperature inside the appliance at a second temperature value that is greater than the temperature in the first step.

The second step is the main cooking and browning phase for the breaded food. Stirring the food inside the chamber makes it possible, in particular, to expose all surfaces of the food to the heat flow. The temperature selected for this second step browns the breading and cooks the food completely.

The relative movement of the stirring means with respect to the reception means may be continuous or intermittent.

In one variation of implementation, the temperature of the first step is between 135° C. and 145° C. The temperature of the second step is between 165° C. and 180° C.

The temperature selection depends, in particular, on the type of breading and the type of food being cooked.

According to another characteristic of the method described in the invention, the duration of the first step accounts for between 35 and 45% of the total duration of both steps. It was noted by the applicant that this specific distribution of the total time of both steps produced particularly satisfactory results. In particular, the breading is not exposed to any mechanical deterioration (crumbling away, breakage). The breading is crispy and golden over the entire surface of the food.

To facilitate a better understanding of the method described in the invention, the operation and use of the appliance are described in detail below.

The user initially prepares the breaded food. In the traditional manner, the last steps of preparation consist of coating the food in breadcrumbs and then applying oil over the surface of the food. The food is then kept in the refrigerator.

Next, the user places the reception means (1) in the enclosure (5) of the casing (4), assembles the stirring means (2) in the reception means (1), places the breaded food in the reception means (1) and, if desired, adds fat or oil, using the scoop (36).

When turning on the appliance, the user selects the appropriate cooking mode and chooses the cooking time through the user interface. In another variation, a predetermined duration may be displayed and then modified by the user, depending on the food or recipe. For example, the total duration of the cooking cycle is between 10 and 50 minutes.

When the user starts the selected cooking cycle of the appliance, the first step of the method described in the invention is initiated by the electronic control unit. Said unit controls the heating means (10) to generate the heat flow (11) entering the reception means (1) through the top opening (3). Moreover, the motor (25) spinning the stirring means (2) in the reception means (1) is not activated. The temperature is regulated to the first temperature value, for example, by an NTC (negative temperature coefficient)-type sensor. When the duration of the first step, corresponding to 40% of the total duration of both steps, has elapsed, the second step of the method described in the invention is initiated.

In this second step, the heating means remains active. The temperature regulation is modified and increased to a second value. Simultaneously, the motor (25) spinning the stirring means (2) in the reception means (1) is activated by the electronic control unit.

The stirring means (2) helps to move the breaded pieces of food with respect to one another.

In particular, the side obstacle (40) blocks a portion of the food located around the edges and raises the food under the action of the food lifting means (32). These actions expose all surfaces of the food to the heat flow.

Once the total duration of the cooking cycle has elapsed, the heating means and the motor are deactivated.

The user can remove the reception means (1) from the casing (4) using a handle (8).

As a variation, other types of heating means (10) may be considered, such as a means of heating by radiation generating a flow of radiant heat (11) entering the reception means (1) through the top opening (3), or even a heating means positioned inside or beneath the reception means (1). If desired, the heating means may be attached to the reception means (1).

As a variation, the stirring means (2) is not necessarily spun inside the reception means (1). In particular, the reception means can be assembled to spin, if desired, in a casing.

As a variation, the reception means (1) is not necessarily formed by a chamber. The reception means preferably has a bottom and a side wall. The reception means can be in the shape of an open-weave basket, for example.

This invention is in no way limited to the example of implementation described and its variations, but encompasses many modifications within the scope of the claims.

The invention claimed is:

1. Cooking method for a food cooking appliance comprising a reception means designed to receive the food, a stirring means positioned inside the reception means, a side obstacle positioned inside the reception means and which extends over at least one portion of a side wall of the reception means and which stems from a support attached to the reception means and is connected to a handle means, and at least one main heating means, the reception means and the stirring means designed to move in relative rotation, the reception means having a top opening, the appliance comprising a means of controlling at least the relative rotation and at least one main heating means, wherein the cooking method comprises:
   A first cooking step during which the relative rotation of the reception means and the stirring means is neutralized and the at least one main heating means is controlled to regulate the temperature to a first set-point value; and
   A second cooking step during which the relative rotation of the reception means and the stirring means is active and the at least one main heating means is controlled to regulate the temperature to a second set-point value that is greater than the first set-point value.

2. Cooking method described in claim 1, wherein the duration of the first cooking step is between 35%-45% of the total time of both cooking steps.

3. Cooking method described in claim 1, wherein the first set-point value is between 135° C. and 145° C.

4. Cooking method described in claim 1, wherein the second set-point value is between 165° C. and 180° C.

5. Cooking method described in claim 1, wherein the total cooking time of both cooking steps corresponds to the cooking time selected by a user.

6. Cooking method described in claim 1, wherein the average speed of the relative rotation of the reception means with respect to the stirring means is between 1 and 5 rpm.

7. Cooking method described in claim 1, wherein the relative rotation of the reception means with respect to the stirring means is continuous.

8. Cooking method described in claim 1, wherein the relative rotation of the reception means with respect to the stirring means is intermittent.

9. Cooking method for a food cooking appliance comprising a reception means designed to receive the food, a stirring means positioned inside the reception means, and at least one main heating means configured to generate a heating flow and comprising a conduit configured to distribute the heating flow into the reception means, a portion of the conduit being arranged in a cover of the food cooking appliance, the reception means and the stirring means designed to move in relative rotation, the reception means having a top opening, the appliance comprising a means of controlling at least the relative rotation and at least one main heating means, wherein the cooking method comprises:
   A first cooking step during which the relative rotation of the reception means and the stirring means is neutralized and the at least one main heating means is controlled to regulate the temperature to a first set-point value; and
   A second cooking step during which the relative rotation of the reception means and the stirring means is active and the at least one main heating means is controlled to regulate the temperature to a second set-point value that is greater than the first set-point value.

10. Cooking method described in claim 1, wherein the at least one main heating means comprises a conduit that distributes hot air into the reception means in which a portion of the conduit is arranged in a cover of the food cooking appliance.

11. Cooking method described in claim 9, wherein the food cooking appliance further comprises a side obstacle positioned inside the reception means and which extends over at least one portion of a side wall of the reception means.

* * * * *